(12) United States Patent
Narula et al.

(10) Patent No.: US 11,556,432 B2
(45) Date of Patent: Jan. 17, 2023

(54) FILTER RESET FOR CLOUD-BASED ANALYTICS ENGINE

(71) Applicant: SAP SE, Walldorf (DE)

(72) Inventors: Sanam Narula, Vancouver (CA); Yahui Ke, Burnaby (CA)

(73) Assignee: SAP SE, Walldorf (DE)

( * ) Notice: Subject to any disclaimer, the term of this patent is extended or adjusted under 35 U.S.C. 154(b) by 76 days.

(21) Appl. No.: 17/377,144

(22) Filed: Jul. 15, 2021

(65) Prior Publication Data

US 2021/0349792 A1    Nov. 11, 2021

Related U.S. Application Data

(63) Continuation of application No. 16/184,622, filed on Nov. 8, 2018, now Pat. No. 11,099,947.

(51) Int. Cl.
| | |
|---|---|
| *G06F 16/95* | (2019.01) |
| *G06F 11/14* | (2006.01) |
| *G06F 9/451* | (2018.01) |
| *G06F 3/0481* | (2022.01) |
| *G06F 16/9535* | (2019.01) |

(52) U.S. Cl.
CPC ........ *G06F 11/1469* (2013.01); *G06F 3/0481* (2013.01); *G06F 9/451* (2018.02); *G06F 16/9535* (2019.01); *G06F 2201/84* (2013.01)

(58) Field of Classification Search
CPC ... G06F 9/451; G06F 16/9535; G06F 11/1469
See application file for complete search history.

(56) References Cited

U.S. PATENT DOCUMENTS

| | | | |
|---|---|---|---|
| 8,621,034 B1* | 12/2013 | Kembel | G06F 3/0481 709/217 |
| 2002/0073080 A1* | 6/2002 | Lipkin | G06F 16/9535 |
| 2006/0005114 A1* | 1/2006 | Williamson | G06T 11/20 345/419 |
| 2006/0095276 A1* | 5/2006 | Axelrod | G06Q 99/00 717/104 |
| 2007/0118813 A1* | 5/2007 | Forstall | G06F 3/0488 715/762 |
| 2008/0034327 A1* | 2/2008 | Cisler | G06F 9/451 715/764 |
| 2009/0006543 A1* | 1/2009 | Smit | G06F 16/951 707/E17.108 |

(Continued)

*Primary Examiner* — Eliyah S. Harper
(74) *Attorney, Agent, or Firm* — Mintz Levin Cohn Ferris Glovsky and Popeo, P.C.

(57) ABSTRACT

A method for accessing data stored in a database may include generating a snapshot of a definition of a data story that includes a software widget configured to receive inputs for creating, based on a portion of data stored in the database, a data presentation providing a visual representation of the data. In response to a first indication to apply a filter removing some of the data associated with the data presentation, modifying a runtime definition of the data story to reflect the application of the filter. In response to a second indication to reset the filter, restoring the data story to a state prior to the application of the filter by replacing the runtime definition of the data story with the snapshot of the definition of the data story. Related systems and articles of manufacture are also provided.

20 Claims, 6 Drawing Sheets

(56) References Cited

U.S. PATENT DOCUMENTS

| | | | |
|---|---|---|---|
| 2014/0223490 A1* | 8/2014 | Pan | H04N 21/8186 345/173 |
| 2016/0034809 A1* | 2/2016 | Trenholm | G06N 3/0454 706/20 |
| 2018/0335939 A1* | 11/2018 | Karunamuni | G06F 3/0481 |
| 2019/0087770 A1* | 3/2019 | Walsh | G06Q 10/087 |

* cited by examiner

FILTER RESET FOR CLOUD-BASED ANALYTICS ENGINE

CROSS REFERENCE TO RELATED APPLICATION

This application is a continuation of U.S. patent application Ser. No. 16/184,622 filed on Nov. 8, 2018, entitled "FILTER RESET FOR CLOUD-BASED ANALYTICS ENGINE". The entire contents of this application is incorporated herein by reference in its entirety.

TECHNICAL FIELD

The subject matter described herein relates generally to database processing and more specifically to a cloud-based analytics engine operating on data stored in a database.

BACKGROUND

A database may be configured to store a plurality of electronic data records. These data records may be organized, in accordance with a database schema, into various database objects including, for example, one or more database tables. The database is coupled with a database management system (DBMS), which may be configured to support a variety of database operations for accessing the data records stored in the database. These database operations may include, for example, structured query language (SQL) queries and/or the like.

SUMMARY

Systems, methods, and articles of manufacture, including computer program products, are provided for accessing data stored in a database. In one aspect, there is provided a system. The system may include at least one data processor and at least one memory. The at least one memory may store instructions that result in operations when executed by the at least one data processor. The operations may include: generating, by an analytics engine, a snapshot of a definition of a data story, the data story including a first software widget configured to receive one or more inputs for creating, based at least on a first portion of data stored in a database, a first data presentation providing a first visual representation of the first portion of data; in response to receiving, at the first software widget, a first indication to apply a filter removing at least some of the first portion of data associated with the first data presentation, modifying, by the analytics engine, a runtime definition of the data story instead of the snapshot of the definition of the data story, the runtime definition of the data story being modified to reflect the application of the filter; and in response to receiving, at the first software widget, a second indication to reset the filter, restoring, by the analytics engine, the data story to a state prior to the application of the filter by at least replacing the runtime definition of the data story with the snapshot of the definition of the data story.

In some variations, one or more features disclosed herein including the following features may optionally be included in any feasible combination. The resetting of the filter may restore the first portion of data that is removed by the application of the filter.

In some variations, the analytics engine may generate a graphic user interface configured to display the first software widget and a second software widget comprising the data story. The graphic user interface may be configured to receive one or more inputs selecting the first software widget and/or the second software widget. In response to receiving, via the graphic user interface, a third indication selecting the first software widget, the analytics engine may update the graphic user interface to display the first software widget in a full screen mode in which the graphic user interface displays the first software widget but not the second software widget. The second software widget may be configured to receive one or more inputs for creating a second data presentation. The second data presentation may provide a second visual representation of the first portion of data and/or a second portion of data stored in the database. The analytics engine may update the graphic user interface to display a third indication corresponding to a status of the application of the filter and/or the resetting of the filter.

In some variations, the definition of the data story may include a representation of the data story in JavaScript Object Notation (JSON), Hypertext Markup Language (HTML), and/or Extensible Markup Language (XML).

In some variations, the snapshot of the definition of the data story may be generated in response to receiving a third indication to load the data story, add the first software widget to the data story, and/or add a second software widget to the data story.

In some variations, the first visual representation may include a chart, a diagram, a table, and/or a graph corresponding to the first portion of data.

In some variations, the first software widget may be a transient application and/or an auxiliary application.

In another aspect, there is provided a method for accessing data stored in a database. The method may include: generating, by an analytics engine, a snapshot of a definition of a data story, the data story including a first software widget configured to receive one or more inputs for creating, based at least on a first portion of data stored in a database, a first data presentation providing a first visual representation of the first portion of data; in response to receiving, at the first software widget, a first indication to apply a filter removing at least some of the first portion of data associated with the first data presentation, modifying, by the analytics engine, a runtime definition of the data story instead of the snapshot of the definition of the data story, the runtime definition of the data story being modified to reflect the application of the filter; and in response to receiving, at the first software widget, a second indication to reset the filter, restoring, by the analytics engine, the data story to a state prior to the application of the filter by at least replacing the runtime definition of the data story with the snapshot of the definition of the data story.

In some variations, one or more features disclosed herein including the following features may optionally be included in any feasible combination. The resetting of the filter may restore the first portion of data that is removed by the application of the filter.

In some variations, the method may further include generating, by the analytics engine, a graphic user interface configured to display the first software widget and a second software widget comprising the data story. The graphic user interface may be configured to receive one or more inputs selecting the first software widget and/or the second software widget. In response to receiving, via the graphic user interface, a third indication selecting the first software widget, the analytics engine may update the graphic user interface to display the first software widget in a full screen mode in which the graphic user interface displays the first software widget but not the second software widget. The second software widget may be configured to receive one or more inputs for creating a second data presentation. The second data presentation may provide a second visual representation of the first portion of data and/or a second portion of data stored in the database. The analytics engine may update the graphic user interface to display a third indication corresponding to a status of the application of the filter and/or the resetting of the filter.

In some variations, the definition of the data story may include a representation of the data story in JavaScript Object Notation (JSON), Hypertext Markup Language (HTML), and/or Extensible Markup Language (XML).

In some variations, the snapshot of the definition of the data story may be generated in response to receiving a third indication to load the data story, add the first software widget to the data story, and/or add a second software widget to the data story.

In another aspect, there is provided a computer program product that includes a non-transitory computer readable storage medium. The non-transitory computer-readable storage medium may include program code that causes operations when executed by at least one data processor. The operations may include: generating, by an analytics engine, a snapshot of a definition of a data story, the data story including a first software widget configured to receive one or more inputs for creating, based at least on a first portion of data stored in a database, a first data presentation providing a first visual representation of the first portion of data; in response to receiving, at the first software widget, a first indication to apply a filter removing at least some of the first portion of data associated with the first data presentation, modifying, by the analytics engine, a runtime definition of the data story instead of the snapshot of the definition of the data story, the runtime definition of the data story being modified to reflect the application of the filter; and in response to receiving, at the first software widget, a second indication to reset the filter, restoring, by the analytics engine, the data story to a state prior to the application of the filter by at least replacing the runtime definition of the data story with the snapshot of the definition of the data story.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a graphic user interface for resetting filters applied to a data presentation providing a visual representation of data stored in a database, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
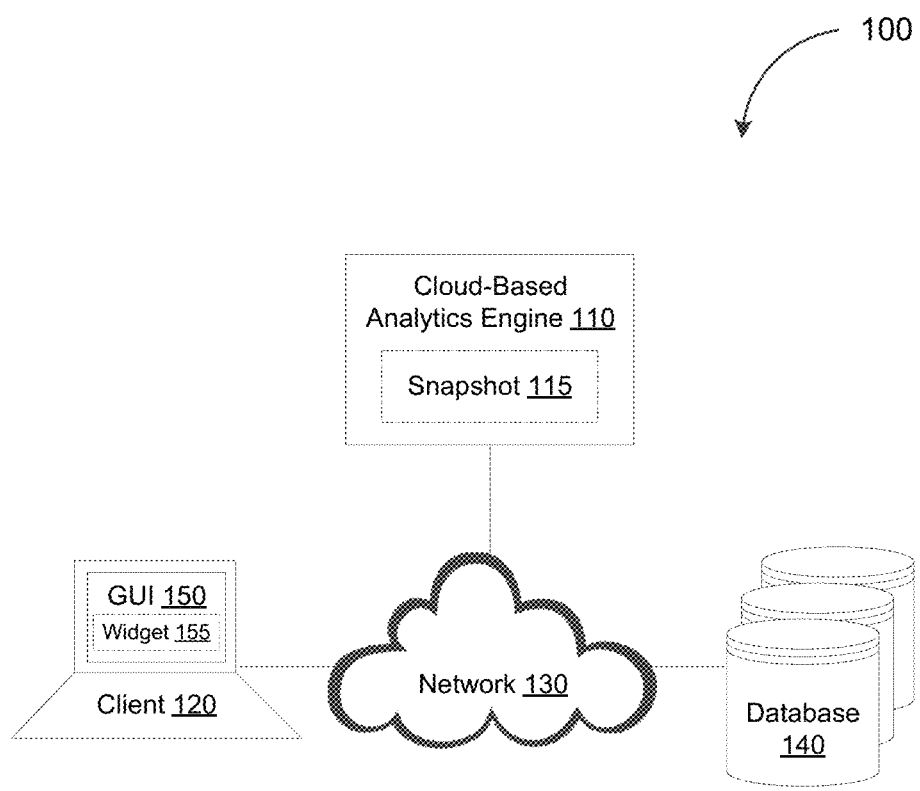
FIG. 1 depicts a system diagram illustrating an analytics system, in accordance with some example embodiments.

A cloud-based analytics engine may provide a variety of functionalities for accessing data stored in a database. For example, the cloud-based analytics engine may be configured to provide one or more software widgets that enable the creation of data presentations that include, for example, a visual representation of at least a portion of the data stored in the database. A software widget may be displayed, at a client, as part of a graphic user interface (GUI). The client may interact with the software widget in order to create, based on at least a portion of the data stored in the database, a corresponding data presentation. By interacting with multiple software widgets, the client may create multiple data presentations to form a data story. The data story may include one or more pages, each of which populated by at least some of the data presentations included in the data story. As used herein, a data story means a collection of software widgets and the corresponding data presentations that are created using the software widgets to provide a visual representation of data stored in a database. For instance, a data story may include a collection of software widgets for creating various data presentations including, for example, charts, diagrams, tables, graphs, and/or the like.

To create the data story as well as the pages and data presentations within the data story, the client may associate each level of the data story with at least a portion of the data stored in the database. For example, the data story may be associated with at least a portion of the data stored in the database while a page within the data story and/or a data presentation within a page of the data story may be associated with at least a subset of that portion of the data. Moreover, while creating the data story, a page within the data story, and/or a presentation within a page of the data story, the client may apply one or more filters to remove at least a portion of the underlying data. The removal of data may trigger one or more modifications to the corresponding visual representation of the data. Accordingly, in some example embodiments, a filter that is applied to one level of a data story may be confined to that level of the data story instead of being propagated to one or more higher levels of the data story. For example, a filter the client applies to a data presentation may be confined to the data presentation instead of being propagated to the page and/or the data story including the data presentation. Confining a filter to the level within the data story that the filter is applied may enable the client to subsequently reset the filter and restore the data that is removed due to the application of the filter.

The data story may be associated with a definition, which may represent the data story using JavaScript Object Notation (JSON), Hypertext Markup Language (HTML), Extensible Markup Language (XML), and/or the like. The definition of the data story may capture a state of the data story that includes, for example, the widgets that are used to create the data presentations included in the data story as well as any filters that are applied to the data story, a page within the data story, and/or a data presentation within the data story. Accordingly, the definition of the data story may change as the client add, to the data story, additional widgets. The definition of the data story may further change when the client applies filters to the data story, a page within the data story, and/or a data presentation within the data story. In some example embodiments, the enable the reset of filters, the cloud-based analytics engine may store a snapshot of the definition of the data story. For example, the cloud-based analytics engine may generate and store a snapshot of the definition of the data story when the client initially loads the data story, when software widgets are added to the data story, and/or when software widgets are removed from the data story. Changes to the data story that arise due to the application of filters may be applied to a separate, runtime definition of the data story such that the snapshot of the definition may remain unaffected by the change. As such, when the client requests to reset a filter that was applied to the data story, a page within the data story, and/or a data presentation within the data story, the cloud-based analytics engine may replace the runtime definition of the data story with the snapshot of the definition of the data story, thereby restoring the data story to a state prior to the application of the filter.

FIG. 1 depicts a system diagram illustrating an analytics system 100, in accordance with some example embodiments. Referring to FIG. 1, the analytics system 100 may include a cloud-based analytics engine 110, a client 120, and a database 140. As shown in FIG. 1, the cloud-based analytics engine 110, the client 120, and the database 140 may be communicatively coupled via a network 130. The network 130 may be any wired and/or wireless network including, for example, a wide area network (WAN), a local area network (LAN), a virtual local area network (VLAN), a public land mobile network (PLMN), the Internet, and/or the like. Meanwhile, the cloud-based analytics engine 110 may provide a variety of cloud-based services to a plurality of remote clients including, for example, the client 120 and/or the like. These cloud-based services may include, for example, software-as-a-service (SaaS), platform-as-a-service (PaaS), infrastructure-as-a-service (IaaS), and/or the like.

In some example embodiments, the client 120 may interact with the cloud-based analytics engine 110 in order to access data stored in the database 140. For example, the client 120 may send, to the cloud-based analytics engine 110, a request create a data story based on at least a portion of the data stored in the database 140. The data story may include at least one page that is populated by one or more data presentations. Each page and/or data presentation within the data story may be associated with at least a subset of the portion of data associated with the data story.

For example, the client 120 may send, to the cloud-based analytics engine 110, a request to create a data story based on sales data stored in the database 140. Accordingly, each page in the data story may correspond to the sales data for a single year while each data presentation in the data story may provide a different visual representation of at least a portion of the sales data for single year. One page in the data story may correspond to the sales data for the year 2017 and the data presentations that are part of that page may include different visual representations (e.g., charts, graphs, tables, diagrams, and/or the like) of the sales data for the year 2017. Alternatively and/or additionally, another page in the data story may correspond to sales data for the year 2018 and the data presentations populating that page may include different visual representations (e.g., charts, graphs, tables, diagrams, and/or the like) of the sales data for the year 2018.

As shown in FIG. 1, the cloud-based analytics engine 110 may generate a graphic user interface 150 configured to receive, at the client 120, one or more inputs for creating the data story, the pages in the data story, and/or the data presentations in the data story. Moreover, the graphic user interface 150 may include one or more software widgets configured to receive, at the client 120, indications to create the individual data presentations in the data story. For instance, FIG. 1 shows the graphic user interface 150 as including a software widget 155. However, it should be appreciated that the graphic user interface 150 may include additional software widgets, each of which being configured to receive indications to create a corresponding type of data presentation. For example, one software widget may be configured to receive indications to create a pie chart while another software widget may be configured to receive indications to create a histogram. As used herein, a software widget may refer to any transient and/or auxiliary application such as, for example, a desk accessory (DA), an applet, and/or the like. A software widget such as, for example, the software widget 155, may be configured to run concurrently within the desktop environment of the client 120 along with and/or as part of one or more other applications such as, for example, a web browser, a web application, and/or a web portal associated with the cloud-based analytics engine 110.

Referring again to FIG. 1, the software widget 155 may be configured to receive, at the client 120, one or more indications to create a corresponding data presentation based on at least a portion of the data stored in the database 140. The data presentation may include a visual representation of at least the portion of the data stored in the database 140 including, for example, a chart, a diagram, a table, a graph and/or the like. As noted, the data used to create the data presentation associated with the software widget 155 may correspond to at least a portion of the data associated with the page and/or the data story containing the data presentation. For example, if the data story is associated with sales data stored in the database 140, the data presentation associated with the software widget 155 may include a visual representation (e.g., a chart, a graph, a table, a diagram, and/or the like) of at least a portion of the sales data for the year 2017.

The software widget 155 may receive, at the client 120, one or more indications to apply a filter to the data used to create the data presentation associated with the software widget 155. Application of the filter may remove at least a portion of the data used to create the data presentation associated with the software widget 155. For example, if the data presentation associated with the software widget 155 initially includes a visual representation (e.g., a chart, a graph, a table, a diagram, and/or the like) of at least a portion of the sales data for the year 2017, a filter may be applied to remove holiday sales data such that the data presentation includes a visual representation of only the non-holiday sales data for the year 2017.

In some example embodiments, the filter that is applied to the software widget 155 may be confined to the software widget 155 instead of being propagated to the page and/or the data story containing the software widget 155. In the previous example, the filter that is applied to remove holiday sales data for the year 2017 may be confined to the software widget 155 such that holiday sales data are not removed from the data associated with the page and/or the data story containing the software widget 155. By preventing the filter from being propagated to the page and/or the data story containing the software widget 155, the cloud-based analytics engine 110 may subsequently be able to reset the filter, for example, in response to further indications the software widgets 155 receives at the client 120.

Resetting the filter may include restoring the holiday sales data that was removed as a result of applying the filter such that the data presentation associated with the software widget 155 may reflect holiday sales data and non-holiday sales data from the year 2017. Furthermore, it should be appreciated that all filters that are applied to the sales data for the year 2017 may be reset at once in order to restore the sales data for the year 2017 to an initial state. The cloud-based analytics engine 110 may, according to some example embodiments, update the graphic user interface 150 to display, at the client 120, an indication corresponding to a status (e.g., success, failure, and/or the like) associated with an application and/or a resetting of the filter, for example, to remove the holiday sales data for the year 2017.

In some example embodiments, the cloud-based analytics engine 110 may respond to an indication to reset a filter by at least loading a snapshot 115 of a definition of the data story that is generated prior to the application of the filter. For example, the data story may be associated with a definition that represents the data story using JavaScript Object Notation (JSON), Hypertext Markup Language (HTML), Extensible Markup Language (XML), and/or the like. The definition of the data story may change as software widgets are added to the data story to create one or more data presentations in the data story. Moreover, the definition of the data story may also change as filters are applied, for example, to the data story, a page within the data story, and/or a data presentation within the data story. As such, the cloud-based analytics engine 110 may generate and store the snapshot 115 in response to one or more indications from the client 120 to load the corresponding story, add a software widget to the data story, and/or remove a software widget from the data story. The cloud-based analytics engine 110 may apply, to a separate, runtime definition of the data story, changes to the data story that arise due to the application of filters such that the snapshot 115 of the definition may remain unaffected by the application of the filter. When the cloud-based analytics engine 110 receives, from the client 120, one or more indications to reset the filter, the cloud-based engine 110 may respond by at least loading the snapshot 115 of the definition of the data story and replacing the runtime definition of the data story with the snapshot 115 of the definition of the data story to at least restore the data story to a state prior to the application of the filter.

In the previous example, the cloud-based analytics engine 110 may generate the snapshot 115 of the definition of the data story in response to an initial loading of the data story and/or the addition of the software widget 155. Meanwhile, the cloud-based analytics engine 110 may update a separate runtime definition of the data story to capture changes that arise due to the application of filters such as, for example, the filter to remove holiday sales data for the year 2017. Accordingly, when the cloud-based analytics engine 110 receives, from the client 120, one or more indications to reset the filter to remove holiday sales data for the year 2017, the cloud-based analytics engine 110 may respond by at least loading the snapshot 115 of the definition of the data story capturing a state of the data story prior to the application of the filter to remove holiday sales data for the year 2017. The cloud-based analytics engine 110 may reset the filter by at least replacing the runtime definition of the data story, which may include the changes associated with the application of the filter to remove holiday sales data for the year 2017, with the snapshot 115 of the definition of the data story.

Figure 2:
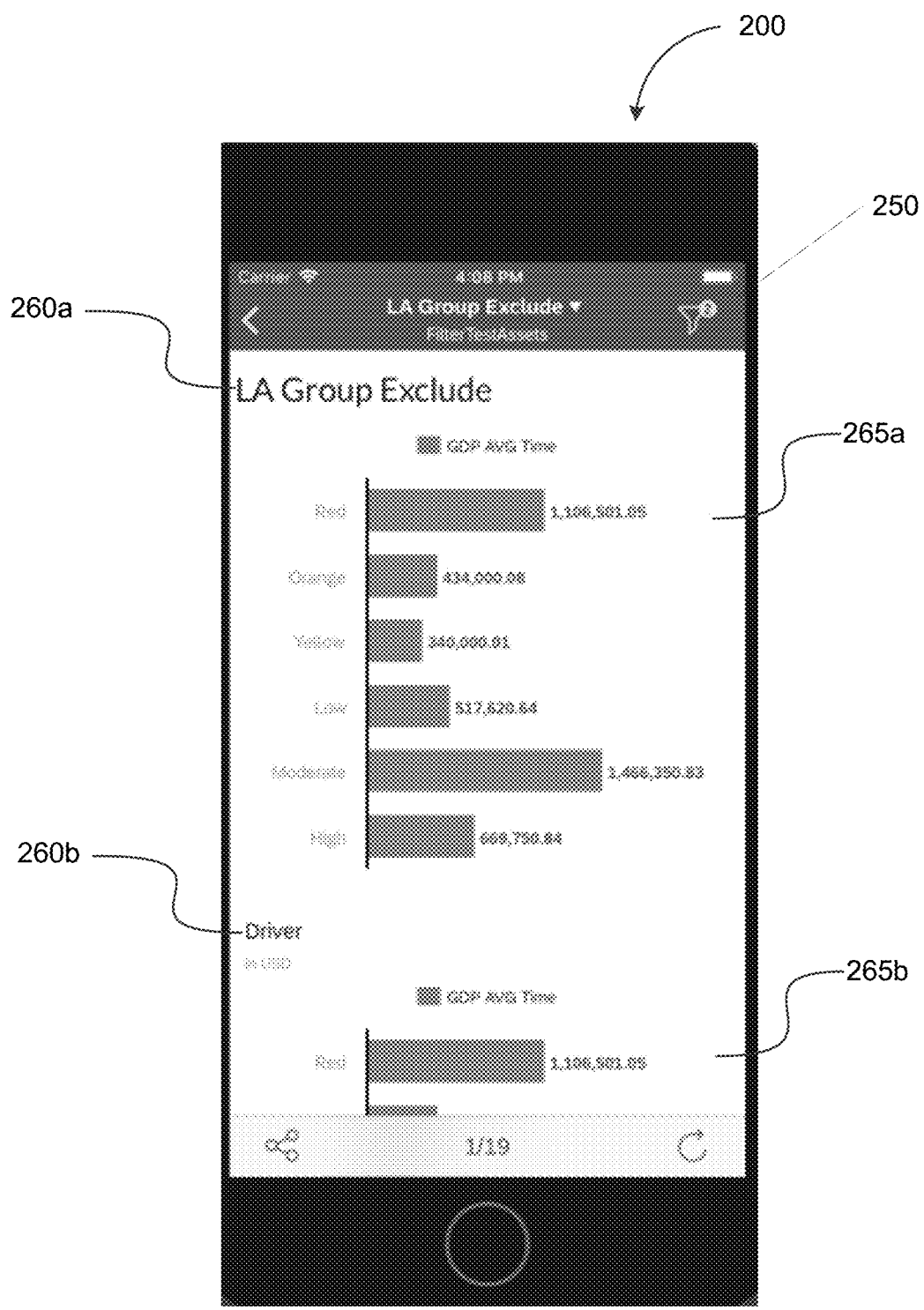
FIG. 2 depicts a screenshot of an example of a user interface displaying a data story, in accordance with some example embodiments.

To further illustrate, FIG. 2 depicts a screenshot of an example of a user interface 200 displaying a data story 250, in accordance with some example embodiments. As shown in FIG. 2, the data story 250 may include one or more software widgets including, for example, a first software widget 260a, a second software widget 260b, and/or the like. The first software widget 260a may be configured to receive, at the client 120, one or more indications to create a first data presentation 265a based on at least a portion of the data stored in the database 140. Alternatively and/or additionally, the second software widget 260b may also be configured to receive, at the client 120, one or more indications to create a second data presentation 265b based on a same and/or different portion of the data from the database 140. As shown in FIG. 2, the first data presentation 265a and the second data presentation 265b may each provide a visual representation of the underlying data including, for example, a chart, a diagram, a table, a graph, and/or the like.

Referring again to FIG. 2, the user interface 200 may display the data story 250 by at least displaying a selection of the software widgets included in the data story 250 including, for example, the first software widget 260a, the second software widget 260b, and/or the like. In the example shown in FIG. 2, the software widgets included in the data story 250 may be disposed along a single lane. That is, the first software widget 260a may be displayed above the second software widget 260b such that the first software widget 260a and the second software widget 260b may become visible on a display device of the client 120 by scrolling along the user interface 200. However, it should be appreciated that the quantity and/or alignment of the software widgets displayed on the user interface 200 may change, for example, to accommodate the dimensions of the display device at the client 120.

As noted, the first software widget 260a and the second software widget 260b may each be configured to receive, at the client 120, one or more indications to create a corresponding data presentation based on at least a portion of the data stored in the database 140. For example, to create and/or modify the first data presentation 265*a* associated with the first software widget 260*a*, the user interface 200 may receive, at the client 120, one or more indications selecting the first software widget 260*a*. Alternatively and/or additionally, to create and/or modify the second data presentation 265*b* associated with the second software widget 260*b*, the user interface 200 may receive, at the client 120, one or more indications selecting the second software widget 260*b*.

The cloud-based analytics engine 110 may respond to the selection of the first software widget 260*a* or the second software widget 260*b* by at least updating the user interface 200. For example, the cloud-based analytics engine 110 may respond to the selection of the first software widget 260*a* by at least updating the user interface 200 to display, in a full screen mode, the first software widget 260*a* and the corresponding first data presentation 265*a*. Alternatively and/or additionally, the user interface 200 may be updated to display the second software widget 260*b* and the second data presentation 265*b* in the full screen mode in response to the selection of the second software widget 260*b*. In some example embodiments, in the full screen mode, the user interface 200 may be updated to display a single software widget. For instance, the user interface 200 in the full screen mode may display one of the first software widget 260*a* and the second software widget 260*b* but not the other of the first software widget 260*a* and the second software widget 260*b*.

Figure 3A:
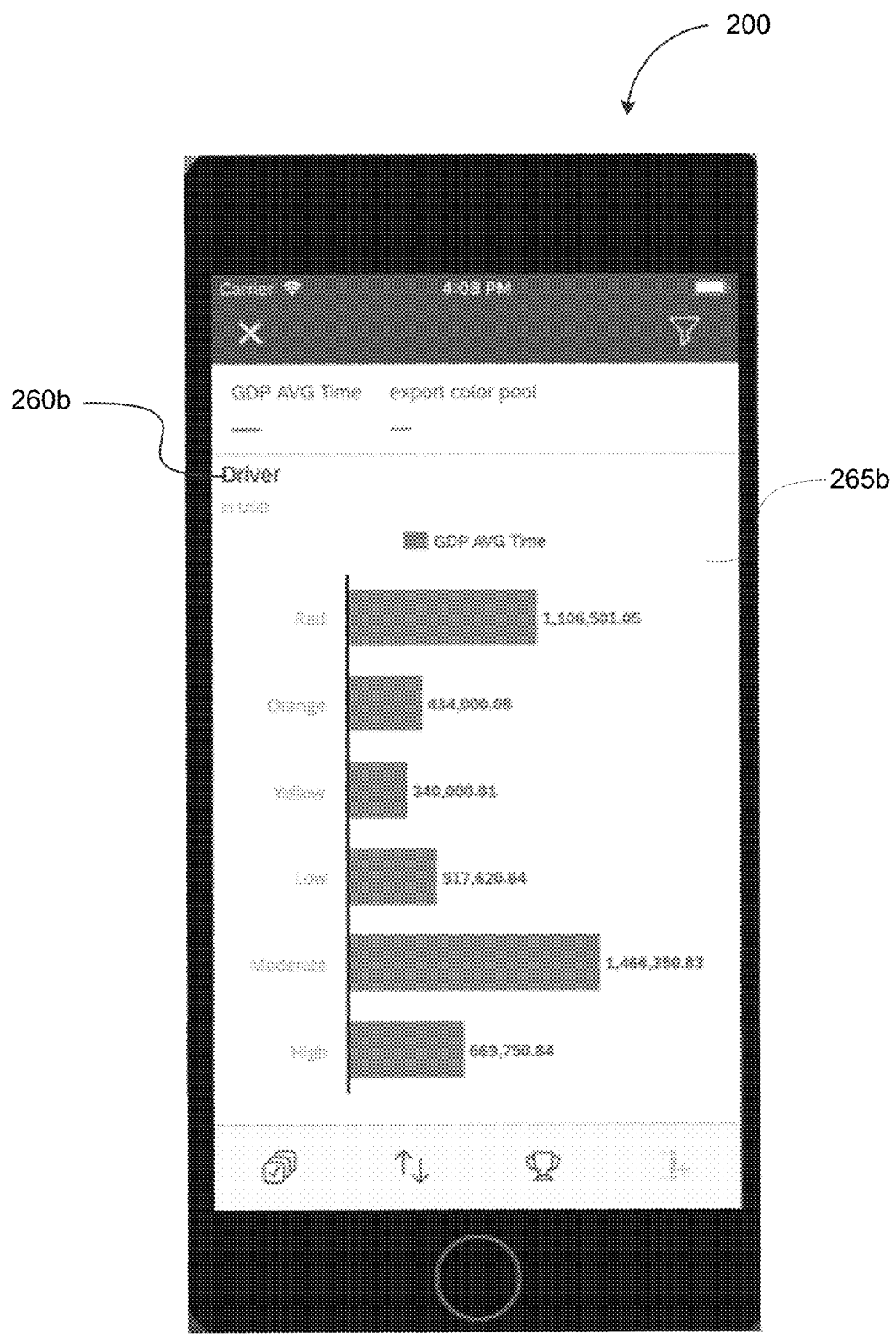
FIG. 3A depicts a screenshot of an example of a user interface displaying a software widget and a corresponding data presentation, in accordance with some example embodiments.
Figure 3B:
FIG. 3B depicts a screenshot of an example of a user interface displaying a software widget and a corresponding data presentation, in accordance with some example embodiments.

To further illustrate, FIGS. 3A-B depict screenshots of an example of the user interface 200 displaying the second software widget 260*b* and the corresponding second data presentation 265*b*, in accordance with some example embodiments. As noted, the cloud-based analytics engine 110 may update the user interface 200 to display the second software widget 260*b* and the corresponding second data presentation 265*b* in full screen mode in response to one or more indications received at the client 120 for selecting the second software widget 260*b*. FIG. 3A depicts the user interface 200, which may be updated to display the second software widget 260*b* and the second data presentation 265*b* in full screen mode.

In some example embodiments, selecting the second software widget 260*b* may further enable interactions with the second software widget 260*b* to modify the second data presentation 265*b*. For example, while the second software widget 260*b* displayed in full screen mode in the user interface 200, the second software widget 260*b* may be configured to receive, at the client 120, indications to apply and/or reset one or more filters including, for example, a filter 270. Applying the filter 270 may remove at least a portion of the data used to generate the second presentation 265*b* while resetting the filter 270 may restore the portion of the data that is removed due to the application of the filter 270. The user interface 200 may be updated in order to reflect the changes to the second presentation 265*b* that arise due to the removal and/or restoration of at least the portion of the underlying data.

In some example embodiments, the application of the filter 270 to the second software widget 260 may be confined to the second software widget 260*a* instead of being propagated to the data story 250 and/or a page within the data story containing the second software widget 260. Moreover, to enable the resetting of the filter 270, the cloud-based analytics engine 110 may generate and store, for example, the snapshot 115 of a definition of the data story 250 upon an initial loading of the data story 250, an addition and/or removal of the first software widget 260*a*, an addition and/or removal of the second software widget 260*b*, and/or the like. The changes associated with the application of the filter 270 may be applied to a separate, runtime definition of the data story 250. As such, the cloud-based analytics engine 110 may respond to the resetting of the filter 270 by at least replacing the runtime definition of the data story 250 with the snapshot 115 of the definition 250.

Figure 4:
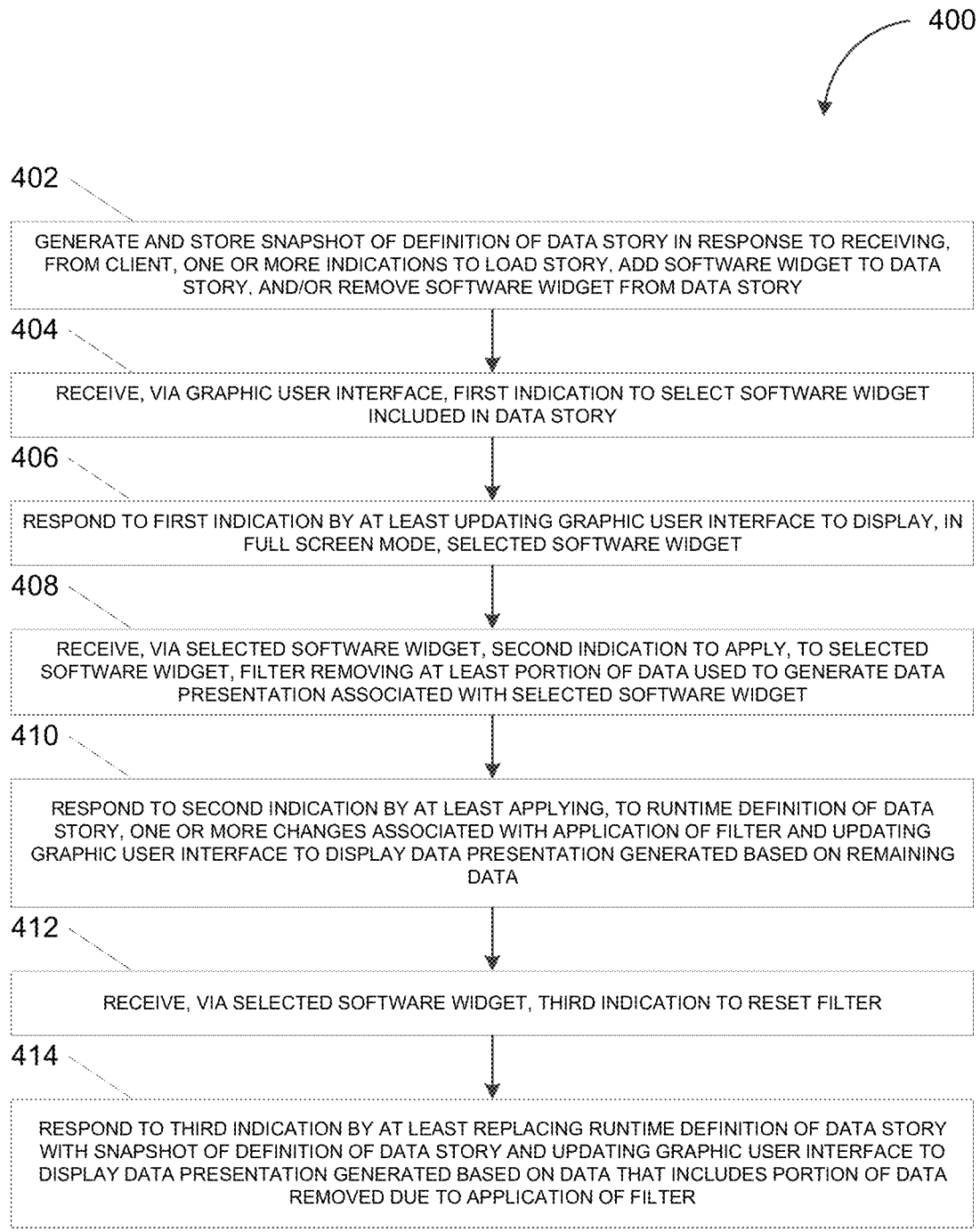
FIG. 4 depicts a flowchart illustrating a process for accessing data stored in a database, in accordance with some example embodiments.

FIG. 4 depicts a flowchart illustrating a process 400 for accessing data stored in a database system, in accordance with some example embodiments. Referring to FIGS. 1, 2, 3A-B, and 4, the process 400 may be performed by the cloud-based analytics engine 110 in order to provide the client 120 one or more functionalities for accessing at least a portion of data stored in the database 140.

At 402, the cloud-based analytics engine 110 may generate and store a snapshot of a definition of the data story in response to receiving, from the client 120, one or more indications to load the data story, add a software widget to the data story, and/or remove a software widget from the data story. For example, the cloud-based analytics engine 110 may generate and store the snapshot 115 in response to receiving, from the client 120, one or more indications to load the data story 250, add the first software widget 260*a* and/or the second software widget 260*b* to the data story 250, and/or remove the first software widget 260*a* and/or the second software widget 260*b* from the data story 250. In some example embodiments, the cloud-based analytics engine 110 may use the snapshot 115 in order to restore the data story 250 to an earlier state such as, for example, a state prior to the application of the filter 270.

At 404, the cloud-based analytics engine 110 may receive, via a graphic user interface, a first indication to select a software widget included in the data story. For example, as shown in FIGS. 3A-B, the cloud-based analytics engine 110 may receive, via the graphic user interface 200, a first indication to select the second software widget 260*b* included in the data story 250.

At 406, the cloud-based analytics engine 110 may respond to the first indication by at least updating the graphic user interface to display, in a full screen mode, the selected software widget. As shown in FIG. 3B, in response to the selection of the second software widget 260*b*, the cloud-based analytics engine 110 may update the graphic user interface 200 to display the second software widget 260*b* in a full screen mode. In some example embodiments, the second software widget 260*b* may be configured to receive inputs for creating and/or modifying the second data presentation 265*b* when the second software widget 260*b* is selected and displayed in full screen mode. However, it should be appreciated that the second software widget 260*b* may be configured to support the receipt of inputs without having to be selected and displayed in full screen mode. For example, the second software widget 260*b* may be configured to receive inputs for creating and/or modifying the second data presentation 265*b* while the second software widget 260*b* is displayed alongside other software widgets such as, for example, the first software widget 260*a* as shown in FIG. 2.

At 408, the cloud-based analytics engine 110 may receive, via the selected software widget, a second indication to apply, to the selected software widget, a filter removing at least a portion of the data used to generate a data presentation associated with the selected software widget. For example, as shown in in FIG. 3B, the second software widget 260*b* may receive, at the client 120, an indication to apply the filter 270 to remove at least a portion of the data that is used to generate the second data presentation 265*b*.

At 410, the cloud-based analytics engine 110 may respond to the second indication by at least applying, to a runtime definition of the data story, one or more changes associated with the application of the filter and updating the graphic user interface to display a data presentation that is generated based on the remaining data. In response to receiving the indication to apply the filter 270 to remove at least the portion of the data used to generate the second data presentation 265b associated with the second software widget 260b, the cloud-based analytics engine 110 may apply, to the runtime definition of the data story 250, one or more changes associated with the application of the filter 270. The changes are applied to the runtime definition of the data story 250 instead of the snapshot 115 of the definition of the data story 250 such that the snapshot 115 of the definition of the data story 250 may remain unaffected by the application of the filter 270. Moreover, in response to the indication to apply the filter 270, the cloud-based analytics engine 110 may update the graphic user interface 200 to display a version of the second data presentation 265b that is modified to reflect the data that is removed due to the application of the filter 270.

At 412, the cloud-based analytics engine 110 may receive, via the selected software widget, a third indication to reset the filter. For example, the second software widget 260b may receive, at the client 120, an indication to reset the filter 270. In some example embodiments, resetting the filter 270 may at least restore the data that is removed due to the application of the filter 270.

At 414, the cloud-based analytics engine 110 may respond to the third indication by at least replacing the runtime definition of the data story with the snapshot of the definition of the data story and updating the graphic user interface to display a data presentation generated based on data that includes the portion of the data that is removed due to the application of the filter. In some example embodiments, the cloud-based analytics engine 110 may respond to the indication to reset the filter 270 by at least restoring, based at least on the snapshot 115 of the definition of the data story 250, the data story 250 to a state prior to the application of the filter 270. For example, the cloud-based analytics engine 110 may load the snapshot 115 of the definition of the data story 250 and replace the runtime definition of the data story 250 with the snapshot 115 of the definition of the data story 250. Moreover, the cloud-based analytics engine 110 may update the graphic user interface 200 to display a version of the second data presentation 265b that is generated based on restored data, which may include the data that is removed due to the application of the filter 270.

Figure 5:
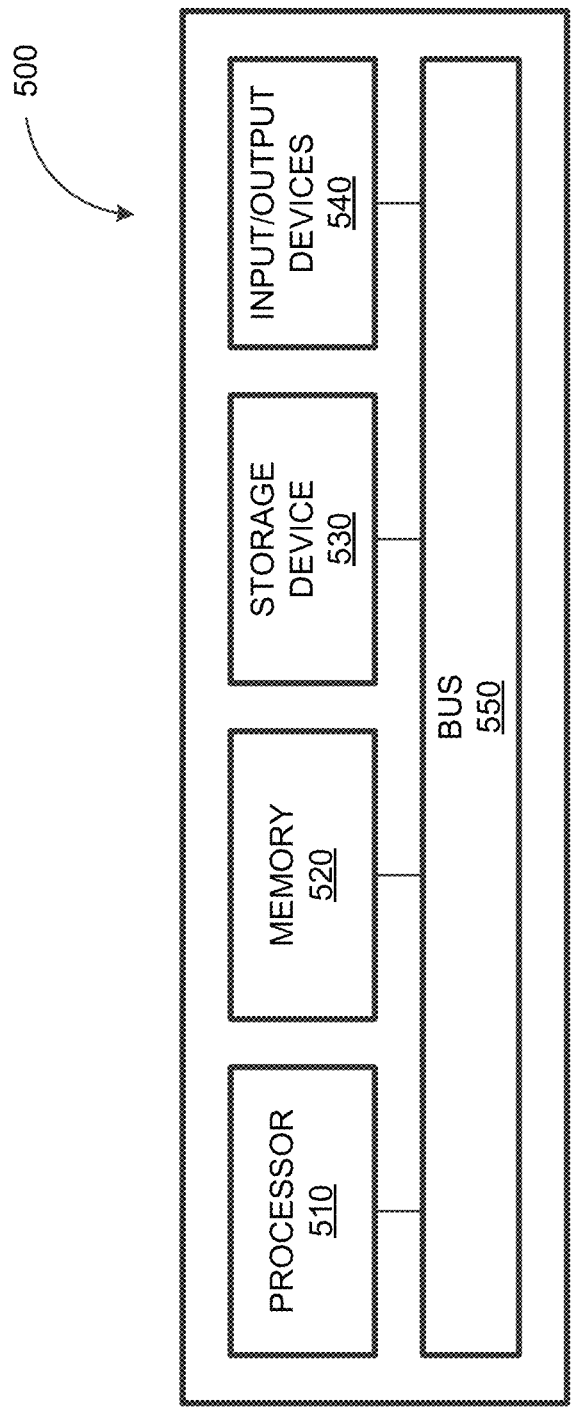
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the cloud-based analytics engine 110 and/or any components therein.

As shown in FIG. 5, the computing system 500 can include a processor 510, a memory 520, a storage device 530, and indication/output devices 540. The processor 510, the memory 520, the storage device 530, and the indication/output devices 540 can be interconnected via a system bus 550. The processor 510 is capable of processing instructions for execution within the computing system 500. Such executed instructions can implement one or more components of, for example, the cloud-based analytics engine 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the indication/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid state device, and/or other suitable persistent storage means. The indication/output device 540 provides indication/output operations for the computing system 500. In some example embodiments, the indication/output device 540 includes a keyboard and/or pointing device. In various implementations, the indication/output device 540 includes a display unit for displaying graphical user interfaces.

According to some example embodiments, the indication/output device 540 can provide indication/output operations for a network device. For example, the indication/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the indication/output device 540. The user interface can be generated and presented to a user by the computing system 500 (e.g., on a computer screen monitor, etc.).

To further illustrate, Table 1 below depicts pseudo programming code implementing an example of a definition of a data story such as, for example, the data story 250. In some example embodiments, the definition of the data story 250 may include a representation of the data story 250 in JavaScript Object Notation (JSON), Hypertext Markup Language (HTML), Extensible Markup Language (XML), and/or the like. As noted, the cloud-based analytics engine 110 may generate and store the snapshot 115 of the definition of the data story 250. The snapshot 115 of the definition of the data story 250 may remain unaffected by changes associated with the application of filters to the data story 250, a page within the data story 250, and/or a data presentation within the data story 250. Accordingly, the snapshot 115 of the definition of the data story 250 may be used when resetting a filter and restoring the data story 250 to a state prior to the application of the filter.

TABLE 1

```
{
  "resourceId": "28F242DE5FD456CAA3A1BA66DE3C6BA7",
  "resourceType": "STORY",
  "ownerId": "PRIVATE_ADMIN",
  "ownerType": "PRIVATE",
  "parentResId": "PRIVATE_ADMIN",
  "updateCounter": 4,
  "origLangu": "E",
  "packageId": "t.TEST",
  "name": "Transient",
  "resourceSubtype":
  "mobileSupport": 1,
  "description":
  "createdBy": "ADMIN",
  "createdTime": "2018-07-13T23:01:13.953Z",
  "modifiedBy": "ADMIN",
  "modifiedTime": "2018-07-13T23:12:11.786Z",
  "access": {
    "": 0
  },
  "texts": [ ],
  "views": [ ],
  "childrenCount": 0,
  "resourceSize": 0,
  "sourceResource": {
    "resourceId": "",
    "parentResId": "",
    "updateCounter": 0,
    "origLangu": "E",
    "packageId": "t.TEST",
    "name":
    "resourceSubtype": "",
    "mobileSupport": 0,
    "description": "",
    "createdBy": "",
    "createdTime": "2018-07-14T06:12:19.347Z",
    "modifiedBy": "",
    "modifiedTime": "2018-07-14T06:12:19.347Z",
    "access": { },
    "texts": [ ],
    "views": [ ],
    "childrenCount": 0,
    "resourceSize": 0,
    "sourceResource": { },
    "favResId": "",
    "shareResId": "",
    "ancestorResource": [ ],
    "ancestorPath": [ ],
    "auth": null,
    "canShare": false,
    "cdata": null,
    "storyContent": null,
    "metadata": null,
    "dependentObjects": [ ],
    "subObjects": [ ],
    "data": null
  },
  "favResId": "",
  "shareResId": "",
  "ancestorResource": [ ],
  "ancestorPath": [ ],
  "auth": {
    "assign": true,
    "read": true,
    "update": true,
    "delete": true,
    "create_doc": true,
    "create_folder": true,
    "create": true,
    "share": true
  },
  "canShare": true,
  "cdata": {
    "storyId": "STORY:t.TEST:28F242DE5FD456CAA3A1BA66DE3C6BA7",
    "title": "Transient",
    "description": "",
```

TABLE 1-continued

```
"content": {
    "version": "2.48",
    "entities": [
        {
            "id": "f0b8d7e3-b626-4d5f-9b73-a4bebfff45fd",
            "name": "New Responsive",
            "type": "story",
            "data": {
                "id": "5bcd8760-20ed-418b-8a96-b6eb4ff16589",
                "title": "New Responsive",
                "pages": [
                    {
                        "title": "Page 1",
                        "hidden": false,
                        "content": {
                            "version": "1.0",
                            "layouts": [
                                {
                                    "id": "responsivelayout",
                                    "definition": {
                                        "type": "sap.lumira.story.layout.responsive",
                                        "page": {
                                            "rows": [
                                                {
                                                    "lanes": [
                                                        {
                                                            "laneId": "8e307746-812e-46ba-b3e6-5984163a941f",
                                                            "widgets": [
                                                                {
                                                                    "widgetId": "b58c0b51-ef9e-49e5-889d-e2239f495d67",
                                                                    "definition": {
                                                                        "x": 1,
                                                                        "y": 1,
                                                                        "cols": 18,
                                                                        "rows": 3,
                                                                        "mobileEnabled": true
                                                                    },
                                                                    "themeSettings": [ ]
                                                                },
                                                                {
                                                                    "widgetId": "009503c5-97bd-46f0-b126-d99a9a49affe",
                                                                    "definition": {
                                                                        "removeable": true,
                                                                        "x": 1,
                                                                        "y": 4,
                                                                        "cols": 8,
                                                                        "rows": 14,
                                                                        "mobileEnabled": true
                                                                    },
                                                                    "themeSettings": [ ]
                                                                },
                                                                {
                                                                    "widgetId": "f50076ce-dd9b-4a72-b296-33e430d4f675",
                                                                    "definition": {
                                                                        "removeable": true,
                                                                        "x": 9,
                                                                        "y": 4,
                                                                        "cols": 8,
                                                                        "rows": 14,
                                                                        "mobileEnabled": true
                                                                    },
                                                                    "themeSettings": [ ]
                                                                }
                                                            ],
                                                            "definition": {
                                                                "cols": 18,
                                                                "showPageTip": true,
                                                            }
                                                            "backgroundColor": ""
                                                        }
                                                    },
                                                    {
                                                        "widgets": [
                                                            "laneId": "ba5e1125-2452-4aa9-9bb4-e4e903f51979",
                                                            "widgetId": "c73d4488-d4d5-4699-884c-a1ddad174638",
```

TABLE 1-continued

```
"definition": {
"x": 19,
"y": 1,
"cols": 18,
"rows": 3,
"mobileEnabled": true
                                                }
,
"themeSettings": [ ]
                                            }
                                        ],
"definition": {
"cols": 18,
"showPageTip": true,
"backgroundColor": ""
                                    },
                                    "laneId":
"f90eef65-d8a2-459d-90da-f53a9dcd72e8"
                                }
                            ],
                            "definition": {
                                "title":
"Row"
                            }
                        }
                    ],
                    "definition": {
                        "title": "Page",
                        "removable": false,
                        "type": "RESPONSIVE",
                        "backgroundColor":
"#FFFFFF"
                    }
                }
            }
        }
    ],
    "widgets": [
        {
            "class":
"sap.fpa.ui .story.entity.header.HeaderWidget",
            "definition": {
                "entityId":"19f217bd-d0df-
4bd5-aa0e-faa30def26db",
                "title": "",
                "fitLaneWidth": true,
                "isPlaceholder": true,
                "placeholderMetatype":
"headerWidget",
                "htmlTitle": "",
                "maxFontSize": 24
            },
            "themeClasses": [ ],
            "dimension": null,
            "id":      "b58c0b51-ef9e-49e5-889d-
e2239f495d67"
        },
        {
            "class":
"sap.fpa.ui.story.entity.header.HeaderWidget",
            "definition": {
                "entityId":    "19f217bd-d0df-
4bd5-aa0e-faa30def26db",
                "title": "",
                "fitLaneWidth": true,
                "isPlaceholder": true,
                "placeholderMetatype":
"headerWidget",
                "htmlTitle": "",
                "maxFontSize": 24
            },
            "themeClasses": [ ],
            "dimension": null,
            "id":     "c73d4488-d4d5-4699-884c-
a1ddad174638"
        },
```

TABLE 1-continued

```
{
    "class": "sap.fpa.ui.story.entity.infochartviz.InfochartVizWidget",
    "definition": {
        "entityId": "94e6d786-7d1b-49be-b414-fd7638976b1f",
        "vizContent": {
            "autoChartType": false,
            "vizDefinition": {
                "chart": {
                    "type": "barcolumn",
                    "bindings": [
                        {
                            "feed": "valueAxis ",
                            "source": [
                                {
                                    "parentKey": {
                                        "id": "parentId",
                                        "type": "hierarchy.pch",
                                        "parentKey": {
                                            "id": "planning: [TENANT_TEST] [ ] [/sap.epm/ProfitAndLoss_qs]",
                                            "type": "dataset"
                                        },
                                        "dimension": "sap.epm:Account"
                                    }
,
                                    "type": "member",
                                    "id": "[sap.epm:Account].[parentId].&[INCOME_STMT]"
                                }
                            ]
                        },
                        {
                            "feed": "categoryAxis",
                            "source": [
                                {
                                    "id": "parentId",
                                    "type": "hierarchy.pch",
                                    "parentKey": {
                                        "id": "planning: [TENANT_TEST] [ ] [/sap.epm/ProfitAndLoss_qs]",
                                        "type": "dataset"
                                    }
,
                                    "dimension": "sap.epm:Region"
                                },
                                {
                                    "id": "parentId",
                                    "type": "hierarchy.pch",
                                    "parentKey": {
                                        "id": "planning: [TENANT_TEST] [ ] [/sap.epm/ProfitAndLoss_qs]",
                                        "type": "dataset"
                                    }
,
                                    "dimension": "sap.epm:Currency"
                                }
                            ]
                        },
                        {
                            "feed": "color",
                            "source": [ ]
                        },
                        {
                            "feed": "pattern2",
                            "source": [ ]
                        },
                        {
                            "feed": "trellis",
                            "source": [ ]
                        },
```

TABLE 1-continued

```
"tooltipValueAxis ", "feed":                         {
[ ]                                                     "feed":
                                                     "source":
                                                           },
                                                           {
                                                              "feed":
"tooltipCategoryAxis",
                                                     "source":
[ ]                                                        }
                                                        ],
                                                        "properties": {
                                                           "general": {
                                                              "layout":
{
"paddingBottom": 10
                                                              },
                                                              "label":
{
"direction": "automatic"
                                                              },
"varianceChart": {
"varianceLabel": {
"responsive": true
                                                              }
                                                           },
"background": {
"visible": false,
"containerWeight": 10
                                                           },
"inverted": true,
"collisionDetection": true,
"colorVarianceByAccType": true,
"isTimestamp": false
                                                           },
                                                           "legend": {
"showFullLabel": true,
                                                              "label":
{
"style": {
"fontFamily": "'72-Web', Arial, Helvetica, sans-serif",
"fontSize": "12px",
"fontWeight": "normal"
                                                                 }
                                                              }
                                                           },
"legendGroup": {
                                                              "layout":
{
"position": "top"
                                                              },
"visible": true,
"responsive": true
                                                           },
                                                           "plotArea": {
"stackColumnLabel": {
"style": {
"fontFamily": "'72-Web', Arial, Helvetica, sans-serif",
"fontSize": "12px",
"fontWeight": "normal",
"color": "rgb(88,89,91)"
                                                              }
                                                           },
"dataLabel ": {
"style": {
"fontFamily": "'72-Web', Arial, Helvetica, sans-serif",
"fontSize": "12px",
"fontWeight": "bold",
"color": "rgb(88,89,91)"
                                                              },
"formatstring": "00.0",
"hideWhenOverlap": true,
"visible": true
                                                              },
"background": {
"visible": false
                                                              },
```

TABLE 1-continued

```
"showLabelNames": false,
"gridline": {
"color": "rgb(241,241,242)"
                              },
                              "gap": {
"innerGroupSpacing": 2
                              }
                          },
"categoryAxis": {
                              "label":
{
"style": {
"fontFamily": "'72-Web', Arial, Helvetica, sans-serif",
"fontSize": "13px",
"color": "rgb(166, 168, 171)"
                              }
                          },
                          "color":
"rgb (0, 0, 0)",
"axisLine": {
"size": 2
                          },
"axisTick": {
"visible": false
                          },
"showLabelGrids": true
                      },
                      "valueAxis":
{
"axisLine": {
"visible": false
                          },
"axisTick": {
"visible": false
                          },
                          "label":
{
"style": {
"fontFamily": "'72-Web', Arial, Helvetica, sans-serif",
"fontSize": "13px",
"color": "rgb(166, 168, 171)"
                          },
"formatstring": "00.0"
                      }
                  }
              },
"hasTitleExpanded": true,
"unbookedDataList": [
                  {
"entityId": {
                              "id":
"parentId",
"type": "hierarchy.pch",
"parentKey": {
"id": "planning: [TENANT_TEST] [ ] [/sap.epm/ProfitAndLoss_qs]",
"type": "dataset"
                          },
"dimension": "sap.epm:Currency"
                      },
"isUnbookedDataSelected": false
                  },
                  {
"entityId": {
                              "id":
"parentId",
"type": "hierarchy.pch",
"parentKey": {
"id": "planning: [TENANT_TEST] [ ] [/sap.epm/ProfitAndLoss_qs]",
"type": "dataset"
                          },
"dimension": "sap.epm:Product"
                      },
"isUnbookedDataSelected": false
                  },
                  {
"entityId": {
                              "id":
"parentId",
"type": "hierarchy.pch",
```

TABLE 1-continued

```
"parentKey": {
"id": "planning: [TENANT_TEST] [ ] [/sap.epm/ProfitAndLoss_qs]",
"type": "dataset"
            },
"dimension": "sap.epm:Region"
          },
"isUnbookedDataSelected": false
        }
      ],
      "title":    "Income
Statement per Currency, Region for Actual",
              "suggestedTitle":
"Income Statement per Currency, Region for Actual",
              "isAutoTopN":
false,
"incompleteDataInfo": {
"isIncomplete": false,
              "rowLimit":
10000
            },
"isAllPointsNull": false,
              "subTitle":    "in
Million USD",
"suggestedSubTitle": "in Million USD",
              "isAutoLimit":
false
          },
          "filters": [
            {
"originalValues": [
              {
"displayName": "Actual",
"operator": "IN",
"argumentKeyInfo": [
                {
"displayName": "Actual",
"sKey": "public.Actual",
"displayKey": "public.Actual",
"category": "Actuals"
                }
              ]
            }
          ],
          "filters": [
            {
"attributeId": [
"sap.epm:ProfitAndLoss_Version02.ID"
              ],
"exclude": false,
"type": "filter",
"entityId": [
                {
"id": "sap.epm:ProfitAndLoss_Version02",
"type": "dimension",
"parentKey": {
"id": "planning: [TENANT_TEST] [ ][/sap.epm/ProfitAndLoss_qs]",
"type": "dataset"
    }
              }
            ],
"answers": [
              {
"function": "IN",
"arguments": [
[
"public.Actual"
    ]
  ]
                }
              ]
            }
          ],
"bookedDataOnly": true,
              "entityId": [
                {
                  "id":
"sap.epm:ProfitAndLoss_Version02",
"type": "dimension",
```

TABLE 1-continued

```
"parentKey": {
"id": "planning: [TENANT_TEST] [ ] [/sap.epm/ProfitAndLoss_qs]",
"type": "dataset"
                                        }
                                    }
                                ],
"filterTokenInfo": { },
"possibleValues": [
                                    {
"key": [
"public.Actual"
                                        ],
"originalValue": {
"displayName": "Actual",
"operator": "IN",
"argumentKeyInfo": [
{
"displayName": "Actual",
"sKey": "public.Actual",
"displayKey": "public.Actual",
"category": "Actuals"
   }
                                            ]
                                        },
"isSelected": true
                                    }
                                ],
                                "type":
"Member"
                            }
                        ],
                        "sort": [ ],
                        "datasets": [
                            {
                                "id":
"planning: [TENANT_TEST] [ ] [/sap.epm/ProfitAndLoss_qs]",
                                "type":
"dataset"
                            }
                        ],
"defaultHierarchyEntities": [
                            {
                                "id": "YQM",
                                "type":
"hierarchy.pch",
                                "dimension":
"sap.epm:ProfitAndLoss_Time",
                                "parentKey":
{
                                    "id":
"planning: [TENANT_TEST] [ ] [/sap.epm/ProfitAndLoss_qs]",
                                    "type":
"dataset"
                                }
                            }
                        ],
                        "targetCurrency": {
"selectedCurrency": "USD",
                            "rate": ""
                        },
                        "userPreferences": {
                          "measure": {
                            "showAs": [ ]
                          }
                        },
                        "joins": [ ],
                        "nullCountMessage":
"",
                        "hierarchyLevelInfo":
[
                            {
                              "entityId": {
                                "id":
"parentId",
                                "type":
"hierarchy.pch",
```

TABLE 1-continued

```
"parentKey": {
        "id":
"planning: [TENANT_TEST] [ ] [/sap.epm/ProfitAndLoss_qs]",
"type": "dataset"
                },
"dimension": "sap.epm:Region"
            },
"hierarchyLevel": 0,
                "mode":
"includeOnlyChildren"
            }
        ],
        "entityFormatInfos":
[ ],
        "analyticObjects": {
"clusteringSettings": { }
        }
    },
    "isPendingTitleRefresh":
false
    },
    "datasets": [
"planning: [TENANT_TEST] [ ] [/sap.epm/ProfitAndLoss_qs]"
    ],
    "thumbnailUrl": null,
    "isPlaceholder": true,
    "actionScope": "group"
},
"themeClasses": [ ],
"dimension": null,
"id":    "009503c5-97bd-46f0-b126-
d99a9a49affe"
    },
    {
        "class":
"sap.fpa.ui.story.entity.infochartviz.InfochartVizWidget",
        "definition": {
            "entityId":    "b1fc6ddd-860f-
4e51-8b1d-14d4b3916792",
            "vizContent": {
                "autoChartType": false,
                "vizDefinition": {
                    "chart": {
                        "type":
"barcolumn",
                        "bindings": [
                            {
                                "feed":
"valueAxis",
                                "source":
[
                                    {
"parentKey": {
"id": "parentId",
"type": "hierarchy.pch",
"parentKey": {
"id": "planning: [TENANT_TEST] [ ] [/sap.epm/ProfitAndLoss_qs]",
"type": "dataset"
    },
"dimension": "sap.epm:Account"
                                    }
,
"type": "member",
"id": "[sap.epm:Account].[parentId].&[INCOME_STMT]"
                                    }
                                ]
                            },
                            {
                                "feed":
"categoryAxis",
                                "source":
[
                                    {
"id": "parentId",
"type": "hierarchy.pch",
```

TABLE 1-continued

```
"parentKey": {
"id": "planning: [TENANT_TEST] [ ] [/sap.epm/ProfitAndLoss_qs]",
"type": "dataset"
               }
,
"dimension": "sap.epm:Currency"
                              }
                            ]
                          },
                          {
                            "feed":
"color",
                            "source":
[ ]
                          },
                          {
                            "feed":
"pattern2",
                            "source":
[ ]
                          },
                          {
                            "feed":
"trellis",
                            source":
[ ]
                          },
                          {
                            "feed":
"tooltipValueAxis",
                            "source":
[ ]
                          },
                          {
                            "feed":
"tooltipCategoryAxis",
                            "source":
[ ]
                          }
                        ],
                        "properties": {
                          "general": {
                            "layout":
{
"paddingBottom": 10
                            },
                            "label":
{
"direction": "automatic"
                            },
"varianceChart": {
"varianceLabel": {
"responsive": true
                            }
                          },
"background": {
"visible": false,
"containerWeight": 10
                            },
"inverted": true,
"collisionDetection": true,
"colorVarianceByAccType": true,
"isTimestamp": false
                          },
                          "legend": {
"showFullLabel": true,
                            "label":
{
"style": {
"fontFamily": "'72-Web', Arial, Helvetica, sans-serif",
"fontSize": "12px",
"fontWeight": "normal"
                            }
                          }
                        },
"legendGroup": {
                            "layout":
{
"position": "top"
                            },
```

TABLE 1-continued

```
"visible": true,
"responsive": true
                                },
                                "plotArea": {
"stackColumnLabel": {
"style": {
"fontFamily": "'72-Web', Arial, Helvetica, sans-serif",
"fontSize": "12px",
"fontWeight": "normal",
"color": "rgb(88,89,91)"
                                        }
                                },
"dataLabel ": {
"style": {
"fontFamily": "'72-Web', Arial, Helvetica, sans-serif",
"fontSize": "12px",
"fontWeight": "bold",
"color": "rgb(88,89,91)"
                                        },
"formatstring": "00.0",
"hideWhenOverlap": true,
"visible": true
                                },
"background": {
"visible": false
                                },
"showLabelNames": false,
"gridline": {
"color": "rgb(241,241,242)"
                                },
                                "gap": {
"innerGroupSpacing": 2
                                        }
                                },
"categoryAxis": {
                                        "label":
{
"style": {
"fontFamily": "'72-Web', Arial, Helvetica, sans-serif",
"fontSize": "13px",
"color": "rgb(166, 168, 171)"
                                                }
                                        },
                                        "color":
"rgb(0, 0, 0)",
"axisLine": {
"size": 2
                                        },
"axisTick": {
"visible": false
                                        },
"showLabelGrids": true
                                        },
                                        "valueAxis":
{
"axisLine": {
"visible": false
                                        },
"axisTick": {
"visible": false
                                        },
                                        "label":
{
"style": {
"fontFamily": "'72-Web', Arial, Helvetica, sans-serif",
"fontSize": "13px",
"color": "rgb(166, 168, 171)"
                                                },
"formatstring": "00.0"
                                        }
                                }
                        },
"hasTitleExpanded": true,
"unbookedDataList": [
                                {
"entityId": {
                                        "id":
"parentId",
"type": "hierarchy.pch",
```

TABLE 1-continued

```
"parentKey": {
"id": "planning: [TENANT_TEST] [ ] [/sap.epm/ProfitAndLoss_qs]",
"type": "dataset"
},
"dimension": "sap.epm:Currency"
},
"isUnbookedDataSelected": false
}
],
"title": "Income Statement per Currency for Actual",
"suggestedTitle": "Income Statement per Currency for Actual",
"isAutoTopN": false,
"incompleteDataInfo": {
"isIncomplete": false,
"rowLimit": 10000
},
"isAllPointsNull": false,
"subTitle": "in Million USD",
"suggestedSubTitle": "in Million USD",
"isAutoLimit": false
},
"filters": [
{
"originalValues": [
{
"displayName": "Actual",
"operator": "IN",
"argumentKeyInfo": [
{
"displayName": "Actual",
"sKey": "public.Actual",
"displayKey": "public.Actual",
"category": "Actuals"
}
]
}
],
"attributeId": [ ],
"sap.epm:ProfitAndLoss_Version02.ID"
],
"exclude": false, {
"type": "filter",
"entityId": [
{
"id": "sap.epm:ProfitAndLoss_Version02",
"type": "dimension",
"parentKey": {
"id": "planning: [TENANT_TEST] [ ] [/sap.epm/ProfitAndLoss_qs]",
"type": "dataset"
}
}
],
"answers": [
{
"function": "IN",
"arguments": [
[
"public.Actual"
]
]
}
],
"bookedDataOnly": true,
"entityId": [
{
"id": "sap.epm:ProfitAndLoss_Version02",
"type": "dimension",
```

TABLE 1-continued

```
"parentKey": {
"id": "planning: [TENANT_TEST] [ ] [/sap.epm/ProfitAndLoss_qs]",
"type": "dataset"
                                        }
                                    }
                                ],
"filterTokenInfo": { },
"possibleValues": [ {
                                    {
"key": [
"public.Actual"
                                    ],
"originalValue": {
"displayName": "Actual",
"operator": "IN",
"argumentKeyInfo": [
{
"displayName": "Actual",
"sKey": "public.Actual",
"displayKey": "public.Actual",
"category": "Actuals"
    }
                                        ]
                                    },
"isSelected": true
                                }
                            ],
                            "type":
"Member"
                        }
                    ],
                    "sort": [ ],
                    "datasets": [
                        {
                            "id":
"planning: [TENANT_TEST] [ ] [/sap.epm/ProfitAndLoss_qs],
                            "type":
"dataset"
                        }
                    ],
"defaultHierarchyEntities": [
                        {
                            "id": "YQM",
                            "type":
"hierarchy.pch",
                            "dimension":
"sap.epm:ProfitAndLoss_Time",
                            "parentKey":
{
                                "id":
"planning: [TENANT_TEST] [ ] [/sap.epm/ProfitAndLoss_qs]",
                                "type":
"dataset"
                            }
                        }
                    ],
                    "targetCurrency": {
"selectedCurrency": "USD",
                        "rate": ""
                    },
                    "userPreferences": {
                        "measure": {
                            "showAs": [ ]
                        }
                    },
                    "joins": [ ],
                    "nullCountMessage":
"",
                    "analyticObjects":{
"clusteringSettings": { }
                    }
                },
                "isPendingTitleRefresh":
false
            },
            "datasets": [
"planning: [TENANT_TEST] [ ] [/sap.epm/ProfitAndLoss_qs]"
                ],
```

TABLE 1-continued

```
                    "thumbnailUrl": null,
                    "isPlaceholder": true
                  },
                  "themeClasses": [ ],
                  "dimension": null,
                  "id":      "f50076ce-dd9b-4a72-b296-33e430d4f675"
                }
              ],
              "filters": [ ],
              "groups": [
                {
                  "pageGroupType": "DefaultPageGroup"
                  "id":      "d57d2f94-3fa3-4fa5-ab45-7af2c8f29ca1",
                  "members": [
                     "009503c5-97bd-46f0-b126-d99a9a49affe",
                     "f50076ce-dd9b-4a72-b296-33e430d4f675"
                  ],
                  "filters": [ ],
                }
              ]
            },
            "id": "c6f06374-f3bb-4187-9714-15d9a6b55be4",
            "suggestedVizSettings": {
              "isCircularSidePanelExpanded": false,
              "selectedMeasures": [ ],
              "selectedDimensions": [ ]
            }
          }
        ],
        "storyFilters": [
          {
            "originalValues": [ ],
            "filters": [
              {
                "attributeId": [
                  "[sap.epm:Currency].key"
                ],
                "exclude": false,
                "type": "filter",
                "entityId": [
                  {
                    "id": "parentId",
                    "type": "hierarchy.pch",
                    "parentKey": {
                      "id": "planning:[TENANT_TEST] [ ] [/sap.epm/ProfitAndLoss_qs]",
                      "type": "dataset"
                    },
                    "dimension": "sap.epm:Currency"
                  }
                ],
                "answers": [ ],
                "dynamicLov": true,
                "allLovSelected": true
              }
            ],
            "showType": "1",
            "bookedDataOnly": true,
            "entityId": [
              "sap.epm:Currency"
            ],
            "hierarchyName": [
              "parentId"
            ],
            "filterTokenInfo": {
              "allowModification": true,
              "hideInFiltersPanel": false,
              "selectionType": "multiple",
              "hierarchyLevelsLimit": −1,
              "disableSelectionType": false
            },
            "icUserSettings": {
              "wordWrapEnabled": true
            },
```

TABLE 1-continued

```
                "possibleValues": [ ],
                "type": "Member",
                "datasetId":
"planning: [TENANT_TEST] [ ] [/sap.epm/ProfitAndLoss_qs]",
                "datasetName": "ProfitAndLoss",
                "datasetDescription":"Profit & Loss per
Region and Product",
                "title": "Currency",
                "target": "ALL",
                "isHyperlinkFilter": false
              }
            ],
            "hyperlinkFilters": [ ],
            "lastDataSource":
"planning: [TENANT_TEST] [ ] [/sap.epm/ProfitAndLoss_qs]",
            "storyWideSettings": {
              "custom.color.palettes": [ ],
              "colors.recent": [ ],
              "custom.markers": [ ],
              "markers.recent": [ ],
              "markers.recent.custom": [ ]
            },
            "pinnedDataPoints": { },
            "queryDefinitions": [ ],
            "colorSync": {
              "version": "1.0.0"
            }
          }
        },
        {
          "type": "sap.lumira.story.entity.header",
          "id": "19f217bd-d0df-4bd5-aa0e-faa30def26db",
          "vendorId":
"sap.epm.story.entity.header.HeaderWidgetVendor",
          "data": {
            "title": "",
            "fitLaneWidth": true,
            "isPlaceholder": true,
            "placeholderMetatype": "headerWidget",
            "htmlTitle": ""
          },
          "originatorId": "1"
        },
        {
          "id":
"planning: [TENANT_TEST] [ ] [/sap.epm/ProfitAndLoss_qs]",
          "type": "dataset",
          "data": {
            "id":
"planning: [TENANT_TEST] [ ] [/sap.epm/ProfitAndLoss_qs]",
            "isPrivate": false,
            "isRemote": false,
            "modelId": "ProfitAndLoss"
          }
        },
        {
          "datasetId":
"planning: [TENANT_TEST] [ ] [/sap.epm/ProfitAndLoss_qs]",
          "alias": "ProfitAndLoss",
          "type": "datasetAlias",
          "id": "1670d04a-98d7-42da-9ade-aee6eae194f2"
        },
        {
          "type": "visualization.infochart",
          "id": "94e6d786-7d1b-49be-b414-fd7638976b1f",
          "vendorId":
"sap.epm.story.entity.infochartviz.InfochartVizVendor",
          "data": {
            "isPlaceHolder": true,
            "content": {
              "error": {
                "message": "At least one measure is required
to build a chart.",
                "code": "STORY_ENT_BEAN_VIZ_DEFAULT_MESSAGE"
              },
              "autoChartType": true,
              "vizDefinition": {
                "chart": {
                  "type": "",
                  "bindings": [ ],
```

TABLE 1-continued

```
                    "properties": { },
                    "hasTitleExpanded": true
                  },
                  "filters": [ ],
                  "sort": [ ],
                  "datasets": [
                    {
                      "id":
"planning: [TENANT_TEST] [ ] [/sap.epm/ProfitAndLoss_qs]",
                      "type": "dataset"
                    }
                  ],
                  "defaultHierarchyEntities": [
                    {
                      "id": "YQM",
                      "type": "hierarchy.pch",
                      "dimension":
"sap.epm: ProfitAndLoss_Time",
                      "parentKey": {
                        "id":
"planning: [TENANT_TEST] [ ] [/sap.epm/ProfitAndLoss_qs]",
                        "type": "dataset"
                      }
                    }
                  ],
                  "targetCurrency": {
                    "selectedCurrency": "USD",
                    "rate": ""
                  }
                }
              },
              "tooltip": "Create New Visualization"
            },
            "datasets": [
              "planning: [TENANT_TEST] [ ] [/sap.epm/ProfitAndLoss_qs]"
            ]
          },
          {
            "type": "visualization.infochart",
            "id": "b1fc6ddd-860f-4e51-8b1d-14d4b3916792",
            "vendorId":
"sap.epm.story.entity.infochartviz.InfochartVizVendor",
            "data": {
              "isPlaceHolder": true,
              "content": {
                "error": {
                  "message": "At least one measure is required
to build a chart.",
                  "code": "STORY_ENT_BEAN_VIZ_DEFAULT_MESSAGE"
                },
                "autoChartType": true,
                "vizDefinition": {
                  "chart": {
                    "type": "",
                    "bindings": [ ],
                    "properties": { },
                    "hasTitleExpanded": true
                  },
                  "filters": [ ],
                  "sort": [ ],
                  "datasets": [
                    {
                      "id":
"planning: [TENANT_TEST] [ ] [/sap.epm/ProfitAndLoss_qs]",
                      "type": "dataset"
                    }
                  ],
                  "defaultHierarchyEntities": [
                    {
                      "id": "YQM",
                      "type": "hierarchy.pch",
                      "dimension":
"sap.epm:ProfitAndLoss_Time",
                      "parentKey": {
                        "id":
"planning: [TENANT_TEST] [ ] [/sap.epm/ProfitAndLoss_qs]",
                        "type": "dataset"
                      }
                    }
                  ],
```

TABLE 1-continued

```
              "targetCurrency": {
                "selectedCurrency": "USD",
                "rate": ""
              }
            }
          }
        },
        "tooltip": "Create New Visualization"
      },
      "datasets": [
        "planning: [TENANT_TEST] [ ] [/sap.epm/ProfitAndLoss_qs]"
      ]
    },
    {
      "type": "predictiveContainer",
      "data": {
        "workflows": { },
        "useWorkflowMap": true
      },
      "id": "dc8b61e9-3b1a-42de-a8de-42785e247778"
    }
    ]
  },
  "isOwner": true,
  "alias": null,
  "tiles": [ ],
  "isSample": false,
  "isTemporary": false,
  "auth": {
    "assign": true,
    "read": true,
    "update": true,
    "delete": true,
    "create_doc": true,
    "create_folder": true,
    "create": true,
    "share": true
  },
  "resourceId": "28F242DE5FD456CAA3A1BA66DE3C6BA7"
},
"storyContent": null,
"metadata": {
  "id": {
    "type": "STORY",
    "name": "28F242DE5FD456CAA3A1BA66DE3C6BA7",
    "package": "t.TEST"
  },
  "description": "Transient",
  "owner": "ADMIN",
  "changedBy": "ADMIN",
  "version": 5,
  "active": true,
  "tmCreated": "2018-07-14T06:01:13.890Z",
  "tmModified": "2018-07-14T06:12:11.779Z",
  "parentId": null,
  "isPrivate": false,
  "isSample": false,
  "dataSize": 16113,
  "createAppVer": "2018.13.0",
  "changeAppVer": "2018.13.0",
  "isEmbedded": false,
  "isTemporary": false
},
"dependentObjects": [ ],
"subObjects": [ ],
"data": null,
"shared": false,
"extensionData": {
  "rIntegration": {
    "validRConnection": true,
    "isBYORConnection": true,
    "enableLiveData": false
  },
  "predictiveRecovery": [ ]
}
}
```

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled receive data and instructions from, and to transmit data and instructions to, a storage system, at least one indication device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide indication to the computer. Other kinds of devices can be used to provide for interaction with a user as well. For example, feedback provided to the user can be any form of sensory feedback, such as for example visual feedback, auditory feedback, or tactile feedback; and indication from the user may be received in any form, including acoustic, speech, or tactile indication. Other possible indication devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
      generating, by an analytics engine, a snapshot of a definition of a data story, the data story including a first software widget configured to receive one or more inputs for creating, based at least on a first portion of data stored in a database, a first data presentation providing a first visual representation of the first portion of data; and
      in response to receiving, at the first software widget, a first indication to reset a filter removing at least some of the first portion of data associated with the first data presentation, restoring, by the analytics engine, the data story to a state prior to the application of the filter by at least replacing a runtime definition of the data story with the snapshot of the definition of the data story.

2. The system of claim 1, further comprising:
   in response to receiving, at the first software widget, a second indication to apply the filter, modifying, by the analytics engine, the runtime definition of the data story to reflect the application of the filter, the runtime definition of the data story being modified instead of the snapshot of the definition of the data story.

3. The system of claim 1, wherein the resetting of the filter restores the first portion of data that is removed by the application of the filter.

4. The system of claim 1, further comprising:
generating, by the analytics engine, a graphic user interface configured to display the first software widget and a second software widget comprising the data story, the graphic user interface configured to receive one or more inputs selecting the first software widget and/or the second software widget, the second software widget configured to receive one or more inputs for creating a second data presentation providing a second visual representation of the first portion of data and/or a second portion of data stored in the database.

5. The system of claim 4, further comprising:
in response to receiving, via the graphic user interface, a second indication selecting the first software widget, updating, by the analytics engine, the graphic user interface to display the first software widget in a full screen mode in which the graphic user interface displays the first software widget but not the second software widget.

6. The system of claim 4, further comprising:
updating, by the analytics engine, the graphic user interface to display a second indication corresponding to a status of the application of the filter and/or the resetting of the filter.

7. The system of claim 1, wherein the definition of the data story comprises a representation of the data story in JavaScript Object Notation (JSON), Hypertext Markup Language (HTML), and/or Extensible Markup Language (XML).

8. The system of claim 1, wherein the snapshot of the definition of the data story is generated in response to receiving a second indication to load the data story, add the first software widget to the data story, and/or add a second software widget to the data story.

9. The system of claim 1, wherein the first visual representation comprises a chart, a diagram, a table, and/or a graph corresponding to the first portion of data.

10. The system of claim 1, wherein the first software widget comprises a transient application and/or an auxiliary application.

11. The system of claim 1, wherein the analytics engine receives the first indication from a remote client, and wherein the analytics engine provides, to the remote client, access to the data stored in the database by at least responding to the first indication.

12. A computer-implemented method, comprising:
generating, by an analytics engine, a snapshot of a definition of a data story, the data story including a first software widget configured to receive one or more inputs for creating, based at least on a first portion of data stored in a database, a first data presentation providing a first visual representation of the first portion of data; and
in response to receiving, at the first software widget, a first indication to reset a filter removing at least some of the first portion of data associated with the first data presentation, restoring, by the analytics engine, the data story to a state prior to the application of the filter by at least replacing a runtime definition of the data story with the snapshot of the definition of the data story.

13. The method of claim 12, further comprising:
in response to receiving, at the first software widget, a second indication to apply the filter, modifying, by the analytics engine, the runtime definition of the data story to reflect the application of the filter, the runtime definition of the data story being modified instead of the snapshot of the definition of the data story.

14. The method of claim 12, further comprising:
generating, by the analytics engine, a graphic user interface configured to display the first software widget and a second software widget comprising the data story, the graphic user interface configured to receive one or more inputs selecting the first software widget and/or the second software widget.

15. The method of claim 14, further comprising:
in response to receiving, via the graphic user interface, a second indication selecting the first software widget, updating, by the analytics engine, the graphic user interface to display the first software widget in a full screen mode in which the graphic user interface displays the first software widget but not the second software widget.

16. The method of claim 14, wherein the second software widget is configured to receive one or more inputs for creating a second data presentation, and wherein the second data presentation provides a second visual representation of the first portion of data and/or a second portion of data stored in the database.

17. The method of claim 14, further comprising:
updating the graphic user interface to display a second indication corresponding to a status of the application of the filter and/or the resetting of the filter.

18. The method of claim 12, wherein the definition of the data story comprises a representation of the data story in JavaScript Object Notation (JSON), Hypertext Markup Language (HTML), and/or Extensible Markup Language (XML).

19. The method of claim 12, wherein the snapshot of the definition of the data story is generated in response to receiving a second indication to load the data story, add the first software widget to the data story, and/or add a second software widget to the data story.

20. A non-transitory computer readable medium storing instructions, which when executed by at least one data processor, result in operations comprising:
generating, by an analytics engine, a snapshot of a definition of a data story, the data story including a software widget configured to receive one or more inputs for creating, based at least on a portion of data stored in a database, a data presentation providing a visual representation of the portion of data; and
in response to receiving, at the software widget, an indication to reset a filter removing at least some of the portion of data associated with the data presentation, restoring, by the analytics engine, the data story to a state prior to the application of the filter by at least replacing a runtime definition of the data story with the snapshot of the definition of the data story.

* * * * *